(12) United States Patent
Hu et al.

(10) Patent No.: US 7,653,270 B2
(45) Date of Patent: Jan. 26, 2010

(54) WAVEGUIDE SENSOR FOR SENSING

(75) Inventors: Szuhan Hu, Ibaraki (JP); Sazzadur Rahman Khan, Ibaraki (JP); Visit Thaveeprungsriporn, Ibaraki (JP); Noriyuki Juni, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/343,959

(22) Filed: Dec. 24, 2008

(65) Prior Publication Data
US 2009/0196544 A1 Aug. 6, 2009

Related U.S. Application Data

(60) Provisional application No. 61/016,637, filed on Dec. 26, 2007.

(51) Int. Cl.
*G02B 6/00* (2006.01)
(52) U.S. Cl. .............................. 385/12; 385/13; 385/14; 385/37; 385/129; 385/130; 385/131; 385/132
(58) Field of Classification Search ............. 385/12–14, 385/37, 129–132
See application file for complete search history.

(56) References Cited

U.S. PATENT DOCUMENTS

| 6,510,263 | B1 * | 1/2003 | Maisenholder et al. | 385/37 |
| 6,903,815 | B2 * | 6/2005 | Uchiyama et al. | 356/305 |
| 7,269,308 | B2 * | 9/2007 | Tono et al. | 385/12 |
| 7,558,446 | B2 * | 7/2009 | Wimberger-Friedl et al. | 385/12 |
| 2005/0094958 | A1 * | 5/2005 | Dorn et al. | 385/129 |
| 2008/0212151 | A1 * | 9/2008 | Wolf et al. | 359/15 |

OTHER PUBLICATIONS

Grubsky, Victor, et al., "Long-Period Fiber Gratings with Variable Coupling for Real-Time Sensing Applications," Optics Letters, Feb. 15, 2000, pp. 203-205, vol. 25, No. 4, Optical Society of America.

* cited by examiner

*Primary Examiner*—Brian M. Healy
*Assistant Examiner*—Guy G Anderson
(74) *Attorney, Agent, or Firm*—Sughrue Mion, PLLC

(57) ABSTRACT

A waveguide sensor according to an embodiment of the present invention includes: a substrate; a first underclad arranged on one side of the substrate; a first sensing core arranged on outer side of the first underclad and having a stripe pattern which extends in one direction; a first overclad arranged on outer side of the first sensing core; a second underclad arranged on another side of the substrate; a second sensing core arranged on outer side of the second underclad and having a stripe pattern which extends in a direction not parallel to the direction in which the first sensing core extends; and a second overclad arranged on outer side of the second sensing core. A first grooved part which extends in a direction not parallel to the direction in which the first sensing core extends is formed on the first overclad, so that the first grooved part and the first sensing core together form a first grating in a plane view. Furthermore, a second grooved part which extends in a direction not parallel to the direction in which the second sensing core extends is formed on the second overclad, so that the second grooved part and the second sensing core together form a second grating in a plane view.

3 Claims, 4 Drawing Sheets

StepA

StepB

StepC

StepD

StepE

StepF

StepG

StepH

StepI

US 7,653,270 B2

WAVEGUIDE SENSOR FOR SENSING

BACKGROUND OF THE INVENTION

1. Field of the Invention

The present invention relates to a waveguide sensor. More specifically, the present invention relates to a waveguide sensor capable of performing mechanical sensing with a remarkably improved sensitivity and performing two-dimensional motion sensing and three-dimensional motion sensing.

2. Description of the Related Art

A waveguide sensor is expected to be used for sensing physical, mechanical, chemical and/or biological characteristics. Conventionally, a fiber-shaped waveguide sensor having a corrugated grating, which is used for sensing strain, torsion and bending, is well known (for example, Victor G. and Jack F., Optical Letters, Vol. 25, No. 4, Feb. 15 (2000), pp. 203-205). Such a sensor typically performs mechanical sensing by detecting strain, torsion, bending or the like. However, such a sensor can't readily provide micro-sensor array with effective cost and fine resolution.

In view of the above, a sensor capable of performing mechanical sensing with an improved sensitivity has been largely demanded.

SUMMARY OF THE INVENTION

The present invention has been made in view of solving conventional problems described above, and an object of the present invention is therefore to provide a sensor capable of performing mechanical sensing with a remarkably improved sensitivity and performing two-dimensional motion sensing and three-dimensional motion sensing.

A waveguide sensor according to an embodiment of the present invention includes: a substrate; a first underclad arranged on one side of the substrate; a first sensing core arranged on outer side of the first underclad and having a stripe pattern which extends in one direction; a first overclad arranged on outer side of the first sensing core; a second underclad arranged on another side of the substrate; a second sensing core arranged on outer side of the second underclad and having a stripe pattern which extends in a direction not parallel to a direction in which the first sensing core extends; and a second overclad arranged on outer side of the second sensing core. A first grooved part which extends in a direction not parallel to a direction in which the first sensing core extends is formed on the first overclad, so that the first grooved part and the first sensing core together form a first grating in a plane view. Furthermore, a second grooved part which extends in a direction not parallel to a direction in which the second sensing core extends is formed on the second overclad, so that the second grooved part and the second sensing core together form a second grating in a plane view.

In one embodiment of the present invention, the waveguide sensor is flexible and in a planar shape.

In another embodiment of the present invention, the waveguide sensor is capable of performing two-dimensional motion sensing and three-dimensional motion sensing.

DESCRIPTION OF THE PREFERRED EMBODIMENTS

Hereinafter, preferred embodiments of the present invention will be described, but the present invention is not limited to the embodiments.

Figure 1A:
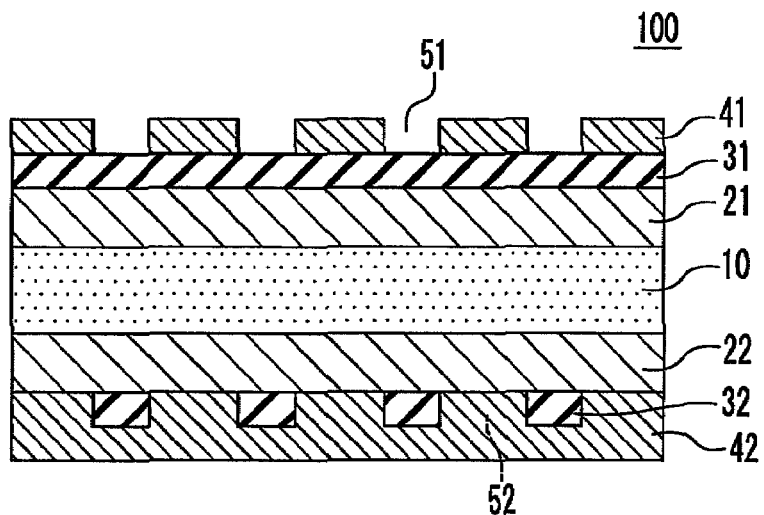
FIGS. 1A to 1C are each a schematic cross-sectional view of a waveguide sensor according to a preferred embodiment of the present invention.
Figure 2A:
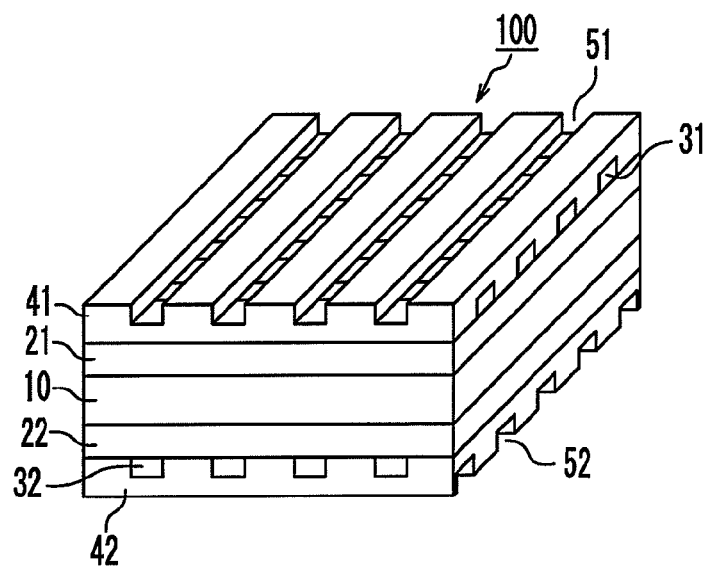
FIGS. 2A to 2C are respectively a schematic perspective view of a waveguide sensor of FIGS. 1A to 1C.

FIG. 1A is a schematic cross-sectional view of a waveguide sensor according to one embodiment of the present invention. FIG. 2A is a schematic perspective view of a waveguide sensor of FIG. 1A. A waveguide sensor 100 includes: a substrate 10; a first underclad 21 arranged on one side of the substrate 10; a first sensing core 31 arranged on outer side of the first underclad 21; a first overclad 41 arranged on outer side of the first sensing core 31; a second underclad 22 arranged on another side of the substrate 10; a second sensing core 32 arranged on outer side of the second underclad 22; and a second overclad 42 arranged on outer side of the second sensing core 32.

In one embodiment, the first sensing core 31 has a stripe pattern which extends in one direction, and the second sensing core 32 has a stripe pattern which extends in a direction not parallel to the direction in which the first sensing core extends. More specifically, the second sensing core 32 may extend in a perpendicular direction to the first sensing core 31; or the second sensing core 32 may define a specific angle with respect to the first sensing core 31 in a plane view. Furthermore, in the present invention, a first grooved part 51 which extends in a direction not parallel to the direction in which the stripe pattern of the first sensing core extends is formed on the first overclad 41. More specifically, the first grooved part 51 may extend in a perpendicular direction to the first sensing core 31; or the first grooved part 51 may define a specific angle with respect to the first sensing core 31 in a plane view. As a result, the first grooved part 51 and the first sensing core 31 together form a first grating in a plane view.

Furthermore, a second grooved part 52 which extends in a direction not parallel to the direction in which the second sensing core extends is formed on the second overclad 42. More specifically, the second grooved part 52 may extend in a perpendicular direction to the second sensing core 32; or the second grooved part 52 may define a specific angle with respect to the second sensing core 32 in a plane view. As a result, the second grooved part 52 and the second sensing core 32 together form a second grating in a plane view.

As described above, the first grooved part 51 and the second grooved part 52 extend in directions not parallel (typically, perpendicular) to each other. Such a configuration (which may also be referred to as "dual-axis" in the present specification) can realize performing two-dimensional motion sensing and three-dimensional motion sensing. Furthermore, as is understood from the above, the waveguide sensor of the present invention has two gratings respectively formed on each side of the waveguide sensor (which may also be referred to as "double-grating" in the present specification). Since the grating enables or enhances sensing and amplifies the sensing output, the waveguide sensor having a double-grating configuration can provide a remarkably improved sensitivity.

Figure 1B:
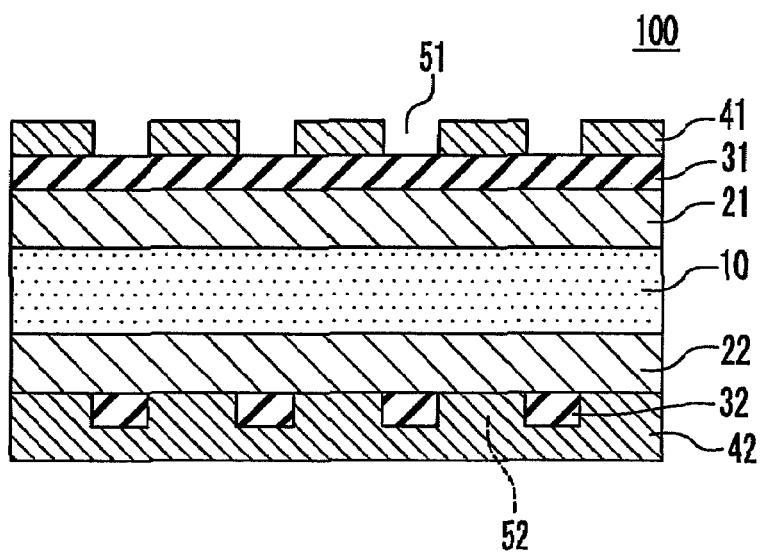
Figure 1C:
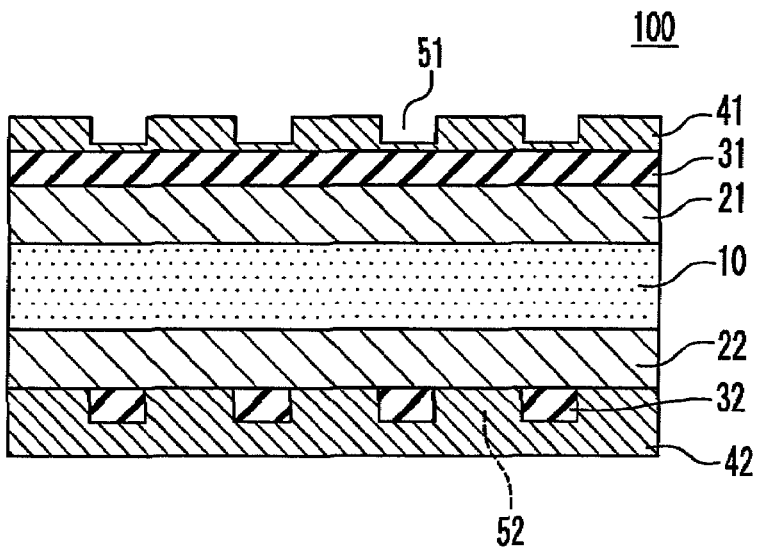
Figure 2B:
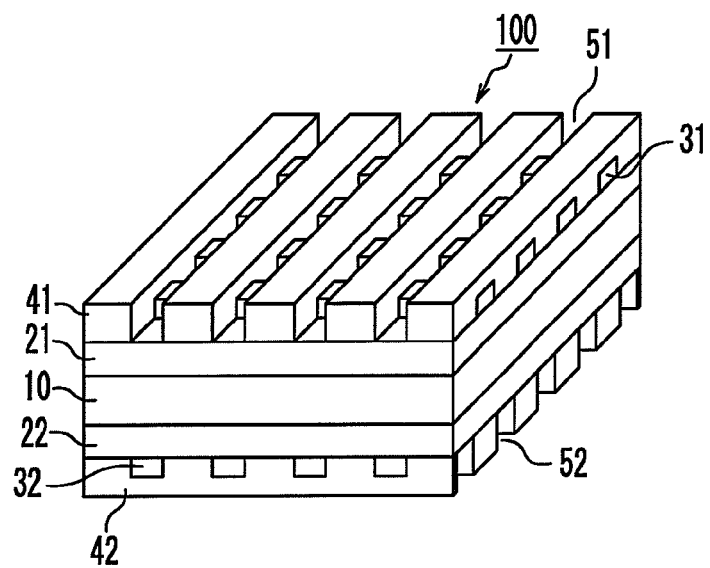
Figure 2C:
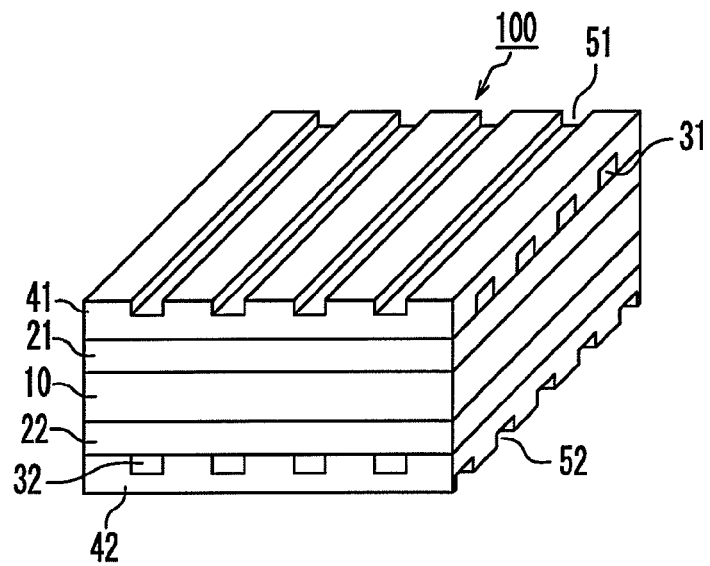

The illustrated example of FIGS. 1A and 2A shows a configuration in which only the outer surfaces of the first sensing core 31 and the second sensing core 32 are exposed (in other words, the outer surface of the first sensing core 31 is flush with the bottom of the first grooved part 51 and the outer surface of the second sensing core 32 is flush with the bottom of the second grooved part 52). In another embodiment as shown in FIGS. 1B and 2B, the side surfaces as well as the outer surface of each of the first sensing core 31 and the second sensing core 32 may be exposed. In still another embodiment as shown in FIGS. 1C and 2C, the outer surface of the first sensing core 31 may be covered with the bottom of the first grooved part 51 and the outer surface of the second sensing core 32 may be covered with the bottom of the second grooved part 52. Needless to say, the configuration illustrated in FIGS. 1A to 1C and 2A to 2C may be combined.

As the substrate 10, any suitable substrate may be employed. Specific example of the substrate includes semiconductor substrates such as silicon wafer, ceramic substrates, glass substrates, metal substrates such as copper, aluminum, stainless steel or alloy thereof, and plastic substrates such as any suitable polymer film. Plastic substrates are preferred for manufacturing, because a flexible waveguide sensor can be obtained. A thickness of the substrate may vary depending on the purpose and is preferably 10 μm to 5,000 μm, and more preferably 20 μm to 1,500 μm.

The first underclad 21 may be formed from any suitable material, as long as the first underclad 21 has a lower refractive index than that of the first sensing core 31 described below. In one embodiment, the first underclad 21 may be formed from a polyimide resin or an epoxy resin. As the polyimide resin and the epoxy resin, any suitable polyimide resin or epoxy resin may be used. Since a polyimide resin and an epoxy resin are well known in the art, the details of such resins are not described in the present specification. For example, a polyimide resin and an epoxy resin are described in JP 2007-279237 A and JP 2004-177864 A, which are herein incorporated by reference. In another embodiment, the first underclad 21 may be formed from a photo-polymerizable composition which is used for forming the first sensing core 31 and/or the second sensing core 32 as described later.

A thickness of the first underclad 21 may vary depending on the purpose and is preferably 5 μm to 500 μm, and more preferably 10 μm to 200 μm. As described above, a refractive index of the first underclad is lower than that of the first sensing core 31. More specifically, a refractive index of the first underclad is preferably 1.50 to 1.59. It should be noted that the refractive index of the respective layers (i.e., the core and the clad) can be controlled, for example, by selecting the type of the material forming each layer and additives to be add to the material, and/or by adjusting the composition of the material and an amount of the additives to be added.

The first sensing core 31 may be formed from any suitable material, as long as the effects of the present invention can be obtained. The first sensing core 31 is preferably formed from a photo-polymerizable composition containing a fluorene derivative and a photo-acid generator. The details of the photo-polymerizable composition are described in JP 2005-266739 A, which is herein incorporated by reference.

A thickness of the first sensing core 31 may vary depending on the purpose and is preferably 5 μm to 500 μm, and more preferably 10 μm to 100 μm. A refractive index of the first sensing core is preferably 1.51 to 1.60. The refractive index difference between the first underclad 21 and the first sensing core 31 is preferably 0.01 to 0.1. The difference in the above range can provide excellent sensitivity.

The first overclad 41 may be formed from the same material as that of the first underclad 21. A thickness of the first overclad 41 may vary depending on the purpose and is preferably 10 μm to 500 μm, and more preferably 20 μm to 100 μm. The thickness in the above range can realize a desired depth of the grating. A refractive index of the first overclad may be identical to or different from that of the first underclad, as long as the refractive index of the first overclad is lower than that of the first sensing core 31. The refractive index difference between the first overclad 41 and the first sensing core 31 is preferably 0.01 to 0.1. The difference in the above range can provide excellent sensitivity.

In the present invention, the first grooved part 51 is formed on the first overclad 41, and the first grooved part 51 and the first sensing core 31 together form a grating in a plane view, as described above. The shape of the grating may be designed appropriately in accordance with the purpose, the characteristics or parameters (e.g., strain, torsion or bending) or motion to be detected, the desired sensitivity or the like. The shape characteristics of the grating include the dimension (the length and the width) of the grating, the pattern (the checkered pattern) of the grating, the depth of the grating (corresponding to total thickness of the first overclad and the first sensing core), the pitch of the groove line (or the wall line) in the first grooved portion, the width of the groove line (or the wall line) in the first grooved portion, the ratio of the groove line width to the groove line pitch, the pitch of the first sensing core line, the width of the first sensing core line, and the ratio of the first sensing core line width to the first sensing core line pitch. The first grooved part 51 used in the present invention can provide a grating which enables or enhances sensing and amplifies the sensing output.

The second underclad 22 may be formed from any suitable material, as long as the second underclad 22 has a lower refractive index than that of the second sensing core 32 described below. In one embodiment, the second underclad 22 may be formed from the same material as that of the first underclad 21. The second underclad 22 may be identical to or different from the first underclad 21.

A thickness of the second underclad 22 may vary depending on the purpose and is preferably 5 μm to 500 μm, and more preferably 10 μm to 200 μm. As described above, a refractive index of the second underclad is lower than that of the second sensing core 32. More specifically, a refractive index of the second underclad is preferably 1.50 to 1.59. The thickness and/or the refractive index of the second underclad 22 may be identical to or different from that of the first underclad 21.

The second sensing core 32 may be formed from any suitable material, as long as the effects of the present invention can be obtained. The second sensing core 32 may be formed from the same material as that of the first sensing core 31. The second sensing core 32 may be identical to or different from the first sensing core 31.

A thickness of the second sensing core 32 may vary depending on the purpose and is preferably 5 μm to 500 μm, and more preferably 10 μm to 100 μm. A refractive index of the second sensing core is preferably 1.51 to 1.60. The refractive index difference between the second underclad 22 and the second sensing core 32 is preferably 0.01 to 0.1. The difference in the above range can provide excellent sensitivity.

A distance between the first sensing core 31 and the second sensing core 32 may vary depending on the purpose. In one embodiment, the distance is preferably 25 μm to 1,500 μm, and more preferably 50 μm to 500 μm. The distance in the above range can provide excellent sensitivity. The distance between the first sensing core 31 and the second sensing core 32 may be controlled by adjusting the thickness of the substrate, the first underclad and the second underclad.

The second overclad 42 may be formed from the same material as that of the second underclad 22. The second overclad 42 may be identical to or different from the first overclad 41. A thickness of the second overclad 42 may vary depending on the purpose and is preferably 10 μm to 500 μm, and more preferably 20 μm to 100 μm. The thickness in the above range can realize a desired depth of the grating. A refractive index of the second overclad may be identical to or different from that of the second underclad, as long as the refractive index of the second overclad is lower than that of the second sensing core 32. The refractive index difference between the second overclad 42 and the second sensing core 32 is preferably 0.01 to 0.1. The difference in the above range can provide excellent sensitivity.

In the present invention, the second grooved part 52 is formed on the second overclad 42, and the second grooved part 52 and the second sensing core 32 together form a grating in a plane view, as described above. The second grooved part 52 used in the present invention can provide a grating which enables or enhances sensing and amplifies the sensing output. The shape of the grating may be designed appropriately in accordance with the purpose, the characteristics or parameters (e.g., strain, torsion or bending) or motion to be detected, the desired sensitivity or the like. The shape of the grating formed by the second grooved part 52 may be identical to or different from that of the grating formed by the first grooved part 51.

As described above, the waveguide sensor of the present invention has a dual-axis configuration. More specifically, the first grooved part 51 and the second grooved part 52 extend in directions not parallel (in one embodiment, perpendicular) to each other; the first sensing core 31 and the second sensing core 32 extend in directions not parallel (in one embodiment, perpendicular) to each other; the first grooved part 51 and the first sensing core 31 extend in directions not parallel (in one embodiment, perpendicular) to each other; and the second grooved part 52 and the second sensing core 32 extend in directions not parallel (in one embodiment, perpendicular) to each other. Therefore, two gratings whose checkered patterns have a crossing (in one embodiment, perpendicular) relationship to each other are formed on each side of the waveguide sensor.

Figure 3A:
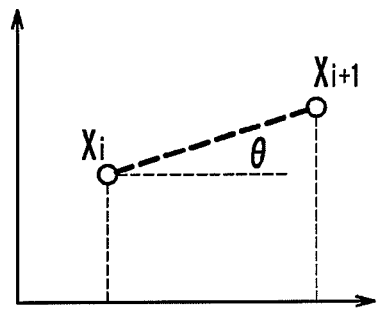
FIGS. 3A and 3B are schematic illustrations showing a concept of two-dimensional motion sensing.
Figure 3B:
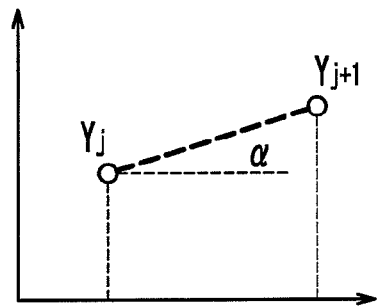

Such a dual-axis configuration can realize detecting kinetic and kinematics information in a two-dimensional or three-dimensional space, so as to perform two-dimensional or three-dimensional motion sensing. For example, one of the gratings can detect deflection and motion in X-direction of the XYZ coordinate and another grating can detect deflection and motion in Y-direction of the XYZ coordinate. For example, a scheme of torsion calculation will be described with referring to FIGS. 3A and 3B. In FIG. 3A, $X_i$ denotes the deflection of the i-th core in X-direction and $X_{i+1}$ denotes the deflection of the (i+1)-th core (the core adjacent to the i-th core) in X-direction, when the sensor is subjected to torsion. As shown in the expression (I) indicated below, the deflection distance between these two adjacent cores is divided by the center-to-center distance $\Delta X$ between these two adjacent cores, to thereby obtain the torsion angle $\theta$ in X-direction. Since the center-to-center distance $\Delta X$ is very small (on micron order), the slope between $X_i$ and $X_{i+1}$, in FIG. 3A could mathematically be treated as a straight line. Meanwhile, using the deflection $Y_j$ of the j-th core and the deflection $Y_{j+1}$ of the (j+1)-th core in Y-direction, the torsion angle $\alpha$ in Y-direction can be obtained by the expression (II) in the same way as that of the angle $\theta$. By determining the torsion angles $\theta$ and $\alpha$ as a function of time, sensing of the two-dimensional motion of the torsion can be realized.

$$\tan^{-1}[(X_{i+1}-X_i)/\Delta X]=\theta \quad \text{(I)}$$

$$\tan^{-1}[(Y_{j+1}-Y_j)/\Delta Y]=\alpha \quad \text{(II)}$$

Figure 4:
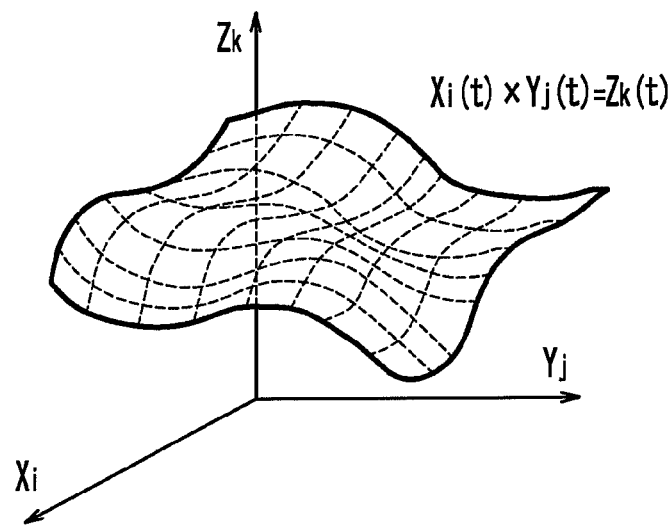
FIG. 4 is a schematic illustration showing a concept of three-dimensional motion sensing.

Furthermore, the deflections X(t) in X-direction, Y(t) in Y-direction and Z(t) in Z-direction respectively as a function of time can be obtained in the same way as the above. Then, using the expression (III) as indicated below (i.e., a vector cross product operation), three-dimensional motion sensing can be realized as shown in FIG. 4.

$$X(t) \times Y(t)=Z(t) \quad \text{(III)}$$

In one embodiment, the waveguide sensor of the present invention has asymmetrical structure. More specifically, the first underclad 21 and the second underclad 22 are identical to each other; the first sensing core 31 and the second sensing core 32 are identical to each other; and the first overclad 41 and the second overclad 42 are identical to each other. Such a symmetrical structure can provide kinetic and kinematics for two-dimensional or three-dimensional motion.

Furthermore, in one embodiment, all the layers of the waveguide sensor of the present invention can be formed from polymer (i.e., a flexible material) and, as is understood from a manufacturing method described below, the waveguide sensor of the present invention may be in a planar shape. As a result, the waveguide sensor of the present invention is much easier to adjust the shape in accordance with the purpose, than conventional optical sensor. Therefore, the waveguide sensor of the present invention is applicable to much wider range of the use. Furthermore, the planar shape can provide a dual-axis and double-grating configuration by cost-effective photolithography.

Although the illustrated example shows a configuration in which each of the first and second gratings is formed over substantially entire surface of the waveguide sensor, the grating may be formed on any appropriate location of each surface of the waveguide sensor in accordance with the purpose. In one embodiment, a plurality of gratings may be formed in matrix, stripe or any appropriate pattern. In such a configuration, the number of the grating may vary depending on the purpose. In another embodiment, a plurality of gratings may be formed at random. In still another embodiment, a single and small grating may be formed at a predetermined position of each of the waveguide sensor surface.

Figure 5:
FIG. 5 is a schematic illustration of a method of manufacturing a waveguide sensor according to a preferred embodiment of the present invention.
Figure 5:
Figure 5:
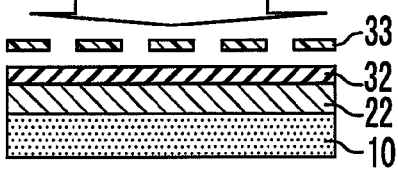
Figure 5:
Figure 5:
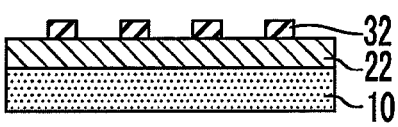
Figure 5:
Figure 5:
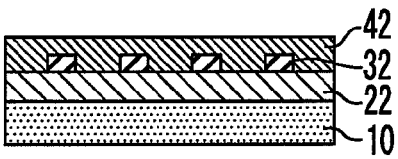
Figure 5:
Figure 5:
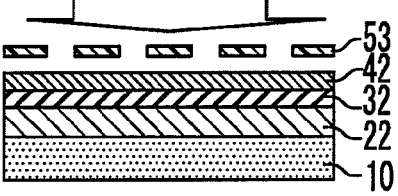
Figure 5:
Figure 5:
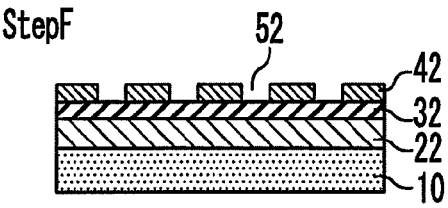
Figure 5:
Figure 5:
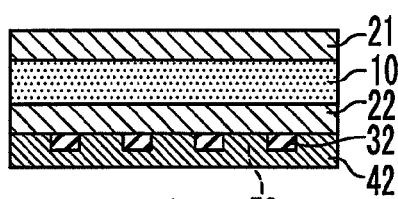
Figure 5:
Figure 5:
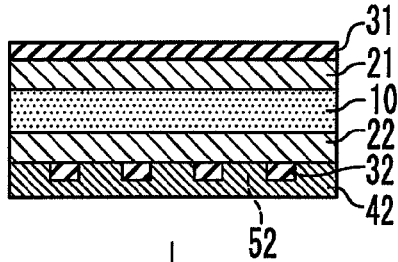
Figure 5:
Figure 5:
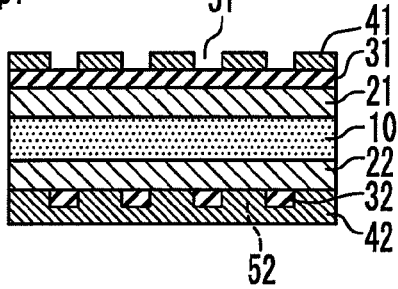

The waveguide sensor of the present invention is manufactured typically by a photolithography. Hereinafter, a preferred example of a method of manufacturing the waveguide sensor of the present invention will be described with referring to FIG. 5.

First, the substrate 10 is prepared. Next, as shown in Step A of FIG. 5, the second underclad 22 is formed on the substrate 10. More specifically, an application liquid containing the material for forming the second underclad is applied on the substrate. An application method is not specifically limited and examples thereof include a spin coating method, a dipping method, a casting method, an injection method and an ink jet method. Then, the applied layer is subjected to pre-baking to remove solvent. Thereafter, the applied layer is irradiated with UV light and subjected to post-irradiation baking to be cured, thereby to form the second underclad 22.

Next, as shown in Step B, an application liquid containing the material for forming the second sensing core is applied on the second underclad 22. The application method is as described above. Then, the solvent is removed by heating at 50° C. to 120° C., to thereby form a resin layer 32' having no surface tackiness. Then, a photomask 33 having a predetermined pattern is placed on the resin layer, and the resin layer 32' is irradiated with energy rays through the photomask 33. Example of the energy rays includes visible light, UV light, infrared light, and e-beam. UV light is preferred because the photolithography can be performed by using a simple and small irradiating apparatus and at low cost. The irradiation amount of UV light is preferably 500 mJ/cm$^2$ to 10,000 mJ/cm$^2$, and more preferably 1,000 mJ/cm$^2$ to 5,000 mJ/cm$^2$. If required, the resin layer may be heated after irradiation. The heating temperature is preferably 80° C. to 250° C., and more preferably 100° C. to 150° C. The heating time is preferably 5 minutes to 2 hours, and more preferably 10 minutes to 1 hour.

Next, as shown in Step C, the resin layer 32' is developed to form the second sensing core 32 having a predetermined pattern (typically, a stripe pattern). A development method, a developer and a development condition may be appropriately selected in accordance with the type of the material for forming the second sensing core. The second sensing core 32 thus formed is cured by heating at, for example, 80° C. to 150° C.

Next, as shown in Step D, an application liquid containing the material for forming the second overclad is applied over the second underclad 22 on which the patterned second sensing core 32 is formed. Thereafter, the applied layer is heated to be cured, thereby to form the second overclad 42. The application method and the heating conditions are as described above with respect to the second underclad.

Next, as shown in Step E, a photomask 53 having a predetermined pattern (typically, a stripe pattern) is placed on the second overclad 42, and the second overclad 42 is irradiated with energy rays (typically, UV light) through the photomask 53. After the irradiation, the development is performed to form the second grooved part 52 at a predetermined location on the second overclad 42 as shown in Step F. Typically, the second grooved part 52 is formed above the second sensing core 32 such that the second grooved part 52 extends in a direction not parallel (in one embodiment, perpendicular) to the direction in which the second sensing core 32 extends. As a result, the intersectional portion of the second grooved part 52 and the second sensing core 32 form a grating in a plane view. It should be noted that the illustration of Steps E and F is viewed from a direction which is rotated by 90° from those of Steps A to D.

Then, as shown in Step G, the laminate obtained through Steps A to F was placed upside down. The first underclad 21 is formed on the side of the substrate 10 on which the second underclad 22 is not formed. More specifically, an application liquid containing the material for forming the first underclad is applied on the substrate. The application method and the formation conditions are as described above with respect to the second underclad. It should be noted that the illustration of Step G and the subsequent steps is again viewed from the direction of Steps A to D.

Next, an application liquid containing the material for forming the first sensing core is applied on the first underclad 21. Then, the applied layer is patterned by irradiation with energy rays (typically, UV light) through a photomask (not shown) having a predetermined pattern. As a result, as shown in Step H, the first sensing core 31 having a predetermined pattern (typically, a stripe pattern) is formed on the first underclad 21. The operations and conditions for forming the first sensing core are described above with respect to the second sensing core.

Next, an application liquid containing the material for forming the first overclad is applied over the first underclad 21 on which the patterned first sensing core 31 is formed. Then, the applied layer is patterned by irradiation with energy rays (typically, UV light) through a photomask (not shown) having a predetermined pattern. As a result, as shown in Step I, the first overclad 41 is formed on the first sensing core 31, and the first grooved part 51 having a predetermined pattern (typically, a stripe pattern) is formed on the first overclad 41.

As described above, the waveguide sensor as shown in FIGS. 1A and 2A is manufactured. Needless to say, the waveguide sensor as shown in FIGS. 1B and 2B, the waveguide sensor as shown in FIGS. 1C and 2C, or any other appropriate waveguide sensors can be manufactured by varying the conditions of the photolithography process.

The waveguide sensor of the present invention may be applicable to, for example, a touch pad for a handheld appliance, a touch panel for a liquid crystal display apparatus, a gimbal for HDD, and a computational spectrum analyzer.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A waveguide sensor, comprising:
   a substrate;
   a first underclad arranged on one side of the substrate;
   a first sensing core arranged on outer side of the first underclad and having a stripe pattern which extends in one direction;
   a first overclad arranged on outer side of the first sensing core;
   a second underclad arranged on another side of the substrate;
   a second sensing core arranged on outer side of the second underclad and having a stripe pattern which extends in a direction not parallel to the direction in which the first sensing core extends; and
   a second overclad arranged on outer side of the second sensing core;
   wherein a first grooved part which extends in a direction not parallel to the direction in which the first sensing core extends is formed on the first overclad, so that the first grooved part and the first sensing core together form a first grating in a plane view; and a second grooved part which extends in a direction not parallel to the direction in which the second sensing core extends is formed on the second overclad, so that the second grooved part and the second sensing core together form a second grating in a plane view.

2. A waveguide sensor according to claim 1, which is flexible and in a planar shape.

3. A waveguide sensor according to claim 1, which is capable of performing two-dimensional motion sensing and three-dimensional motion sensing.

* * * * *